United States Patent [19]

Thebert

[11] Patent Number: 4,683,714
[45] Date of Patent: Aug. 4, 1987

[54] OIL SCAVENGE SYSTEM

[75] Inventor: Glenn W. Thebert, Carmel, Ind.

[73] Assignee: General Motors Corporation, Detroit, Mich.

[21] Appl. No.: 875,176

[22] Filed: Jun. 17, 1986

[51] Int. Cl.$^4$ ............................................. F02C 7/06
[52] U.S. Cl. .................................. 60/39.02; 60/39.08; 184/6.11
[58] Field of Search .......................... 60/39.02, 39.08; 184/6.11, 11.1

[56] References Cited

U.S. PATENT DOCUMENTS

| | | | |
|---|---|---|---|
| 2,934,168 | 4/1960 | Klompas | 184/6 |
| 2,991,005 | 7/1961 | Hall | 415/170 |
| 3,074,688 | 1/1963 | De Muth et al. | 415/175 |
| 3,325,088 | 6/1967 | Keen et al. | 415/69 |
| 3,903,690 | 9/1975 | Jones | 60/39.08 |
| 4,265,334 | 5/1981 | Benhase | 60/39.08 |
| 4,344,506 | 8/1982 | Smith | 60/39 |
| 4,468,066 | 8/1984 | Alcorta et al. | 308/187 |
| 4,525,995 | 7/1985 | Clark | 60/39 |
| 4,541,784 | 9/1985 | Horler | 60/39.08 |
| 4,576,001 | 3/1986 | Smith | 60/39 |

*Primary Examiner*—Louis J. Casaregola
*Attorney, Agent, or Firm*—Saul Schwartz

[57] ABSTRACT

An oil scavenging system for a main shaft bearing in a gas turbine engine includes a sump adjacent the bearing having a frustoconical inner surface and a constant diameter inner surface contiguous with the frustoconical surface. The small diameter end of the frustoconical surface is adjacent the bearing and the latter includes a low efficiency pumping member which pumps the oil onto the frustoconical inner surface with high tangential velocity. The oil centrifugally adheres to and migrates along the frustoconical surface and has sufficient tangential velocity to also centrifugally adhere to the constant diameter surface. The oil adhering to the constant diameter surface drains into drain entry in the constant diameter surface and is collected by a single scavenge pump pick-up regardless of engine attitude or altitude.

6 Claims, 4 Drawing Figures

OIL SCAVENGE SYSTEM

The invention described herein was made in the course of work on a contract or subcontract thereunder of the Department of Defense.

BACKGROUND OF THE INVENTION

1. Field of the Invention

This invention relates generally to gas turbine engines and, more particularly, to lubricant scavenge systems for such engines.

2. Description of the Prior Art

Lubricant scavenge systems, referred to hereinafter simply as oil scavenge systems, in gas turbine engines remove lubricant from a sump area within the engine adjacent components, typically bearings, which require constant lubrication during engine operation. Because it is often desirable to avoid submerging the lubricated component in lubricant, oil scavenge systems in aircraft propulsion gas turbine engines may include multiple scavenge pumps drawing lubricant from the sump through multiple pick-up locations in the sump so that scavenging is assured regardless of the attitude of the engine and aircraft. Multiple pumps and their associated connections and hardware, however, increase weight and complexity of the engine and also the cost. In addition, in multiple pump systems where the sump is inboard of the gas flow path, the flow lines to the scavenge pumps which traverse the gas flow path may be susceptible to coking of the residual oil therein when not flowing significant quantities of oil. Other oil scavenge systems in aircraft gas turbine engines assure adequate scavenging at all aircraft altitudes by pressurizing the sump to force the oil thru the scavenge pump lines. In these systems, special sump seals are required to maintain sump pressurization. An oil scavenge system according to this invention represents a new and improved alternative to these types of systems in that it does not rely upon sump pressurization nor multiple scavenge pumps and associated hardware to assure adequate sump scavenging at all attitudes and altitudes at which the engine may operate.

SUMMARY OF THE INVENTION

This invention is a new and improved oil scavenge system particularly suited for aircraft propulsion gas turbine engines which scavenges regardless of aircraft attitude or altitude in a simple and economical manner. In the oil scavenge system according to this invention, oil is pumped from lubricated and/or cooled engine components onto specially shaped, stationary sump walls with high tangential velocity so that the oil centrifugally adheres to the walls regardless of engine attitude or sump pressure, the shape of the sump walls being predetermined to direct the spinning oil thereon to a single pick-up to which the single scavenge pump is connected. In the preferred embodiment of the oil scavenge system according to this invention, the shape of the sump walls is predetermined to define a conical internal surface having a small diameter end adjacent the lubricated component and a larger diameter end axially spaced from the small diameter end and contiguous with a circular edge of a constant diameter, internal cylindrical surface in which the single pick-up well is located so that the spinning oil on the conical surface migrates axially to the constant diameter surface and, because of its continued spinning on the latter, collects on the constant diameter surface in trough-like fashion and drains therefrom through the pick-up. In the preferred embodiment of the oil scavenge system according to this invention, the sump is bounded on opposite ends by a pair of main shaft bearings and the conical internal surfaces expand radially from each bearing and axially toward the center of the sump whereat the drain entry is located. In the preferred embodiment, the main shaft bearing assemblies are provided with means for assuring that oil used for lubrication and cooling of the bearings and associated seals is positively routed axially to the small diameter ends of the conical internal surfaces and then pumped onto the latter with high tangential velocity by simple, relatively low efficiency pumping devices rotating at the high speed of the engine main shaft.

Figures 1, 2A:
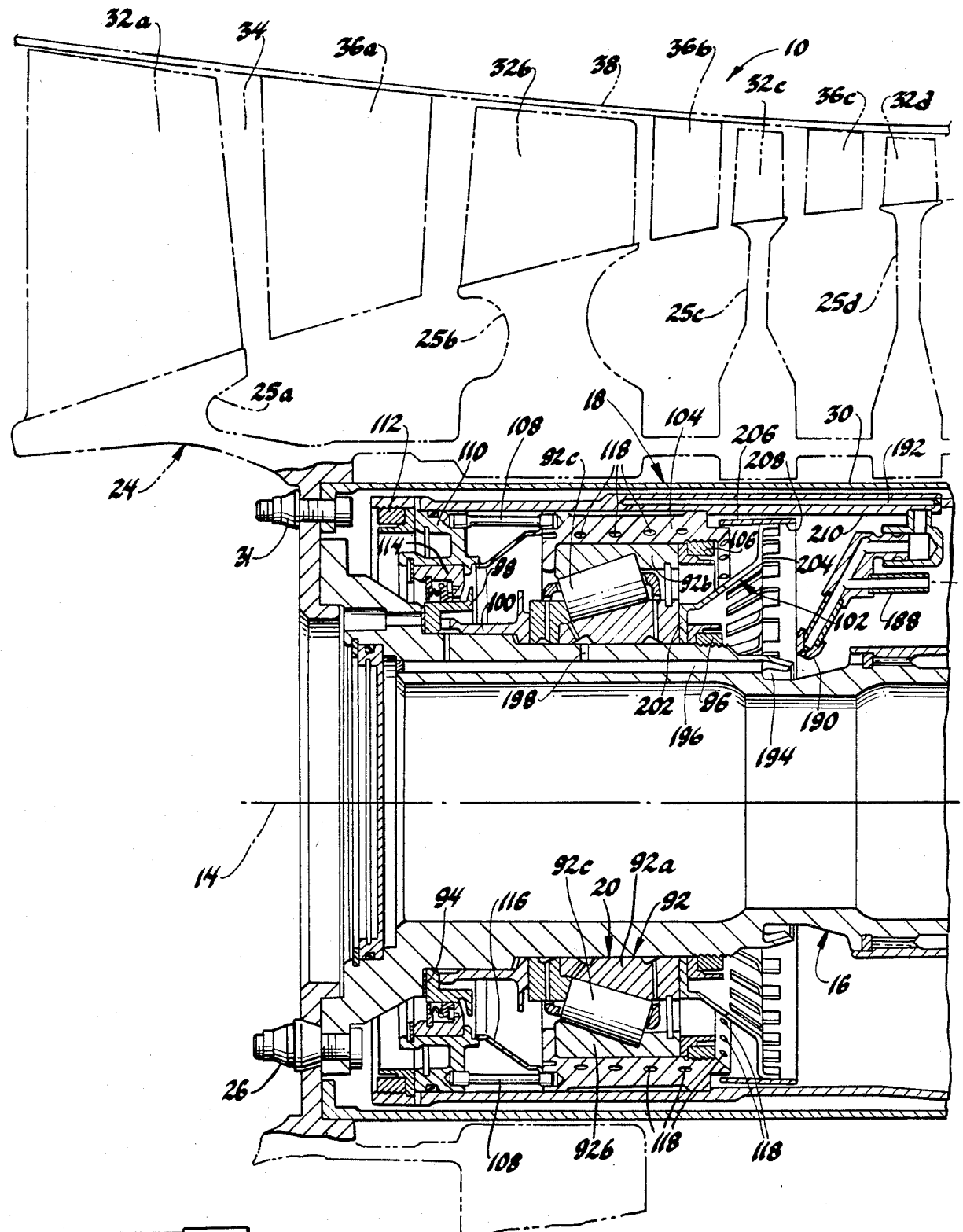
FIG. 1 is a block diagram showing the arrangement of FIGS. 2a, 2b and 2c.
FIGS. 2a, 2b and 2c are combined as shown in FIG. 1 and illustrate in fragmentary longitudinal section a gas turbine engine having an oil scavenge system according to this invention.

Referring now to the drawings, a gas turbine engine 10 is partially illustrated in longitudinal section. The engine is shown in the position it assumes when an aircraft in which the engine is installed is on the ground or in normal, horizontal flight. Unless otherwise indicated, the structural elements shown in elevation in the figures are bodies of revolution and, for simplicity, are not continuously described as annular or cylindrical. Similarly, where the figures illustrate only one of a plurality of elements distributed in a circumferential array, the representative single element illustrated is identified and described in the plural sense.

The gas turbine engine 10 includes a case assembly 12 having a main axis 14. A main shaft 16 of the engine is supported on a pedestal mount 18 of the case assembly by a pair of main bearing assemblies 20 and 22 described further hereinafter. A compressor rotor 24, representative of compressor rotors generally, has five unitarily rotatable wheels 25a–e disposed around the left or forward end of the pedestal mount 18 and is attached to the left end of main shaft 16 by a circumferential array of bolts 26. A pair of seal runners 28 are clamped against the right end of the compressor rotor 24 by a sleeve 30 bolted to the rotor by a circumferential array of bolts 31 and are rotatable as a unit with the main shaft. Each of the compressor wheels has a blade stage 32a–e thereon disposed in a gas flow path 34 which extends from an inlet, not shown, at the left end of the engine as illustrated to an exhaust, not shown, at the right end of the engine. The compressor blade stages 32a–e are separated by a corresponding plurality of stator vane stages 36a–e rigidly attached to a compressor housing portion 38 of the case assembly 12. The innermost stator vane stage 36e has an outer flange 40 captured between an appropriate flange on the compressor housing portion 38 and a similarly appropriate flange on a combustor housing portion 42 of the case assembly 12. The innermost stator vane stage 36e also includes an inner flange 44.

A turbine wheel 46 is rigidly attached by a circumferential array of bolts 48 to an appropriate flange at the right end of main shaft 16 for rotation as a unit therewith. A seal runner 50 is captured between the bolts 48 and the turbine wheel 46 and rotates as a unit with the latter. The turbine wheel 46 includes a stage of turbine blades 52 disposed in a downstream portion of the flow path 34 behind a stage of nozzle vanes 54. The nozzle vanes are rigidly supported on a turbine housing portion 56 of the case assembly 12 by an array of schematically illustrated outer struts 58 attached to the turbine housing portion and by a similarly schematically illustrated inner support 59 attached to a web 60 of the pedestal mount 18. A schematically illustrated combustor 62 is disposed in a compressed air plenum 63 bounded at opposite ends by the stator vanes 36e and by the turbine wheel and radially by the combustor housing portion 42 and the web 60. Compressed air delivered to the plenum 63 by the compressor rotor 24 supports fuel combustion in the combustor whereby hot gas motive fluid is discharged through the nozzle 54 onto the turbine blades 52. Free power turbine stages, not shown, may be disposed in the flow path 34 downstream of the turbine blades 52 for power takeoff from the engine or the main shaft 16 may be extended to provide a direct power output.

The pedestal mount 18 has a first wall 64 from which the web 60 projects. The first wall 64 has an inturned flange 66 at its right end and an inturned flange 68 at its left end adjacent the flange 44 on the stator vane stage 36e. A plurality of circumferentially arrayed radially extending struts 70 integral with the first wall 64 project across the gas flow path 34 and are, in turn, rigidly connected to the combustor housing portion 42 of the case assembly 12.

The pedestal mount 18 further includes a second wall 72 within the first wall 64 having an outwardly directed flange 74 at its right end adjacent the flange 66 on the first wall 64 and a larger outwardly directed flange 76 at its left end. The outer extremity of the flange 76 is disposed between the flanges 44 and 68 and is rigidly attached to each by an array of fasteners, not shown. The flange 74 of the second wall 72 is rigidly attached to the flange 66 on the first wall 64 by a similar array of fasteners 77, FIG. 2c.

A third wall 78 of the pedestal mount adjacent the second wall 72 has an outwardly directed flange 80 at its right end bearing against an end surface 82 of the second wall 72 and piloted on a lip 83 of the latter. A circumferential array of bolts 84 through the flange 80 on the third wall 78 and the flange 76 on the second wall 72 rigidly connect the second and third walls together so that a sump 85 is defined therein. A pair of stationary supports 86 on the flange 76 carry abradeable seals which cooperate with the seal runners 28 on the compressor rotor 24 in defining a pair of labyrinth seals between a high pressure zone 88 and a buffer pressure zone 90 between the sleeve 30 and the third wall 78.

Describing, now, how the main shaft 16 is rotatably supported on the pedestal mount 18, the bearing assemblies 20 and 22 are conventional and representative of gas turbine rotor bearings generally. As part of the oil scavenge system according to this invention, however, the bearing assemblies 20 and 22 are specially adapted as described later to manage oil flow. With respect to rotary support, the main bearing assembly 20 includes a taper roller bearing 92 having an inner race 92a, an outer race 92b, and a plurality of rollers 92c therebetween. The inner race 92a is captured between a shoulder 94 on the main shaft 16 and a retaining ring 96 threaded onto the main shaft, a pair of oil slingers 98 and 100 being captured between the inner race 92a and the shoulder 94 and a first pumping device 102 being captured between the retaining ring 96 and the inner race 92a. The slingers 98 and 100, the inner race 92a and the pumping device 102 all rotate as a unit with the main shaft 16. The outer race 92b is held in a first squeeze film damping ring 104 by a retainer 106. The damping ring 104 is connected by a circumferential array of resilient rods 108 to a support 110 disposed within the left end of third wall 78. The support 110 is rigidly captured against a shoulder of the third wall by a retaining ring 112 threaded into the third wall. A stationary seal 114 on the support 110 bears against the rotating slinger 98 and separates the buffer pressure zone 90 from the sump 85. A frustoconical baffle 116 between the support 110 and the damping ring 104 is disposed outboard of the slingers 98 and 100. A circumferential array of helical or spiral bores 118 through the damping ring 104, FIG. 2a, coincide with the radially outermost extremity of the baffle 116 and provide flow channels from the left side of the damping ring 104 to the right side thereof. While not illustrated as such, the damping ring 104 may be manufactured as a composite to facilitate formation of the helical bores.

The second main bearing assembly 22 includes a roller bearing 120 having an inner race 120a, an outer race 120b and a plurality of rollers 120c. The inner race 120a is captured between a retaining ring 122 threaded on the main shaft 16 and a shoulder 124 of the main shaft. A seal runner 126 and a pair of slingers 128 and 130 are captured between the inner race 120a and the shoulder 124 and a second pumping device 132 is captured between the retaining ring 122 and the inner race 120a. The seal runner 126, the slingers 128 and 130, the inner race 120a, and the pumping device 132 all rotate as a unit with the main shaft 16. The outer race 120b is non-rotatably connected to a second squeeze film damping ring 134 which is non-rotatably connected to a pedestal mount extension 136. The extension 136 has a flange 138 at the left end thereof which butts against the flange 66 on the first wall 64 and is rigidly connected to the latter by the same array of fasteners which connect the flange 74 on the second wall 72 to the flange 66. The damping ring 134 is captured between a shoulder on the extension 136 and a seal support 140 which is held against the right end of the extension by another seal support 142 fastened to the extension by a circumferential array of bolts 144. Another seal support 146 is also fastened to the pedestal extension 136 by the bolts 144. Abradeable seals on the supports 142 and 146 cooperate with the seal runners 126 and 50 rotating with the main shaft 16 in defining a pair of labyrinth seals. The labyrinth seals cooperate with a stationary seal 148 on the support 140 bearing against the slinger 128 to provide sealing between a hot gas, high pressure zone 150 and the sump 85.

Figure 2B:
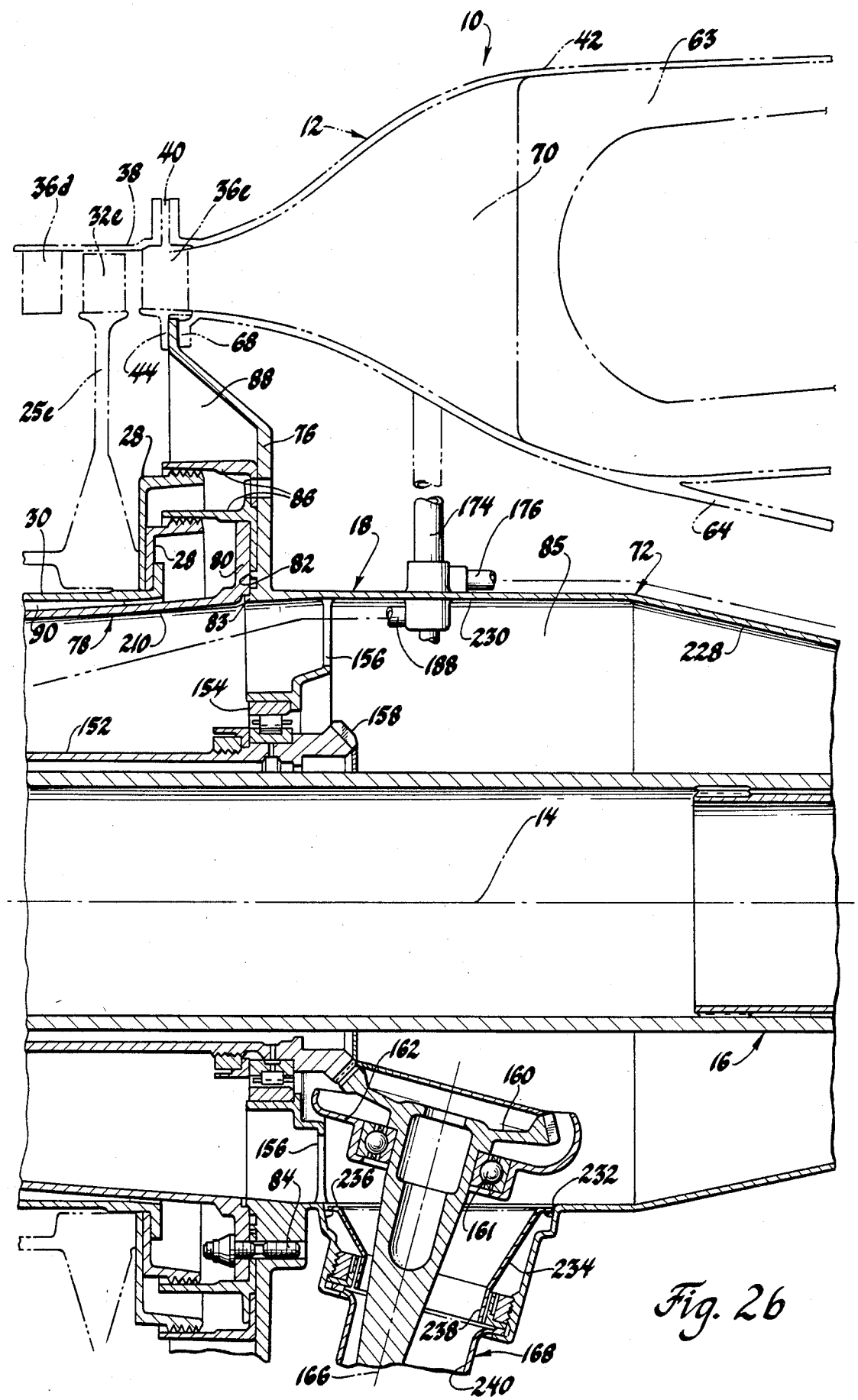

As seen best in FIGS. 2a and 2b, an auxiliary drive sleeve 152 is spline-connected at its left end to the main shaft 16 for rotation as a unit therewith and is supported at its right end by a roller bearing 154 disposed on a circumferential array of radially inwardly extending supports 156 integral with the second wall 72. A bevel gear 158 on the right end of the drive sleeve 152 rotates as a unit therewith. The bevel gear 158 meshes with an auxiliary drive pinion 160 supported by a bearing 161 on a bracket 162 connected to the second wall 72. The pinion 160 rotates about a generally radially extending axis 166 of the engine. The auxiliary drive pinion 160 is disposed within a hollow shield 168 which traverses the gas flow path 34. The gear train defined by the sleeve 152, the bevel gear 158, and the pinion 160 represents a power take-off for driving auxiliary devices such as fuel pumps, electrical generation equipment or the like.

Oil is supplied to the main bearing assemblies 20 and 22 through a tube 174 which traverses the gas flow path 34 through one of the radial struts 70. A first branch 176 connected to the tube 174 outboard of the second wall 72 feeds oil across the flanges 74 and 66 to a gallery 178 in the pedestal mount extension 136 and to a nozzle 180 on the pedestal mount extension, FIG. 2c. The gallery 178 feeds a damping chamber around the squeeze film damping ring 134. The nozzle 180 sprays oil into a rotating trough 182 on the main shaft 16 from which a gallery 184 within the main shaft is fed in conventional fashion. A plurality of radial orifices 186 direct oil from the gallery 184 to the bearing 120 and to the seal runner portion of the slinger 128 under pressure developed by the rotation of the main shaft 16. The seal 148 and the pressure differential between the hot gas, high pressure zone 150 and the sump 85 prevents oil from escaping out the right end of the sump.

A second branch 188 connected to the tube 174 inboard of the second wall 72 feeds oil from the tube 174 to a nozzle 190 and to a gallery 192 in an enlarged rib on the third wall 78, FIGS. 2a and 2b. The gallery 192 feeds a damping chamber outboard of the squeeze film damping ring 104. The nozzle 190 directs oil into a rotating trough 194 on the main shaft 16 from which a gallery 196 in the main shaft is fed in conventional fashion. A plurality of radial orifices 198 feed oil from the gallery 196 to the bearing 92 and to the seal runner portion of the slinger 98 for cooling. Oil is prevented from escaping out the left end of the sump 85 by the seal 114 and the pressure differential between the sump and buffer pressure zone 90.

Oil dispensed by the radial orifices 186 and 198 in the bearing assemblies 22 and 20, respectively, is scavenged from the sump 85 by the scavenge system according to this invention at all engine attitudes and/or altitudes with only a single scavenge pump. More particularly, in main bearing assembly 20, oil dispensed through the orifices 198 to the left of the bearing 92 is thrown radially outward by the slingers 98 and 100 onto the conical baffle 116. This oil has high tangential velocity due to the high rotational speed of the main shaft 16 so that even though the baffle 116 is stationary, the oil impinging thereon spins over the inner surface of the baffle around the axis 14. The spinning oil adheres centrifugally to the inner surface of the baffle 116 and simultaneously migrates outwardly along the baffle toward the squeeze film damping ring 104. As a result of the continuous impingement of oil on the baffle 116 and migration thereof toward the damping ring 104, oil collects in a pool at the juncture between the baffle and the damping ring. The entrances to the bores 118 through the damping ring are below the surface of the pool so that the oil continuously drains from the pool through the bores to the right side of the ring. While the damping ring 104 is stationary, the helical bores 118 preserve the tangential component of motion of the oil so that oil issuing from the bores at the right side of the damping ring has both tangential and axial motion components.

Continuing the description of oil scavenge from main bearing assembly 20, the pumping device 102 rotating at high speed with the main shaft 16 includes a continuous inner hub section 202 whereat the pumping device is connected to the main shaft and a circumferential array of spokes 204 extending radially outward from the hub section 202. The pumping device 102 further includes a flat impeller 206 which extends completely around the pumping device and is rigidly attached to each of the spokes 204 by conventional means, as by welding. The flat impeller 206 defines an inner surface 208 which slightly overlaps the right end of damping ring 104 radially outboard of the bores 118 and tapers radially outward in the axial direction toward the center of the sump 85. The oil issuing from the bores 118 migrates radially outward onto the surface 208 of the impeller 206. The impeller accelerates the oil tangentially and the oil centrifugally adheres to the surface 208 and migrates from the left end thereof adjacent the damping ring, between the spokes 204, and off of the right end of the impeller. The oil issues from the right end of the impeller onto an inner surface 210 of the third wall 78 with high tangential velocity due to the high rotational speed of the impeller 206. As seen best in FIGS. 2a and 2b, the inner surface 210 is a conical internal surface around the left portion of the sump 85 having a small diameter end located adjacent the main bearing assembly 20 and a large diameter end spaced axially to the right of the small diameter end toward the center of the sump 85.

Figure 2C:
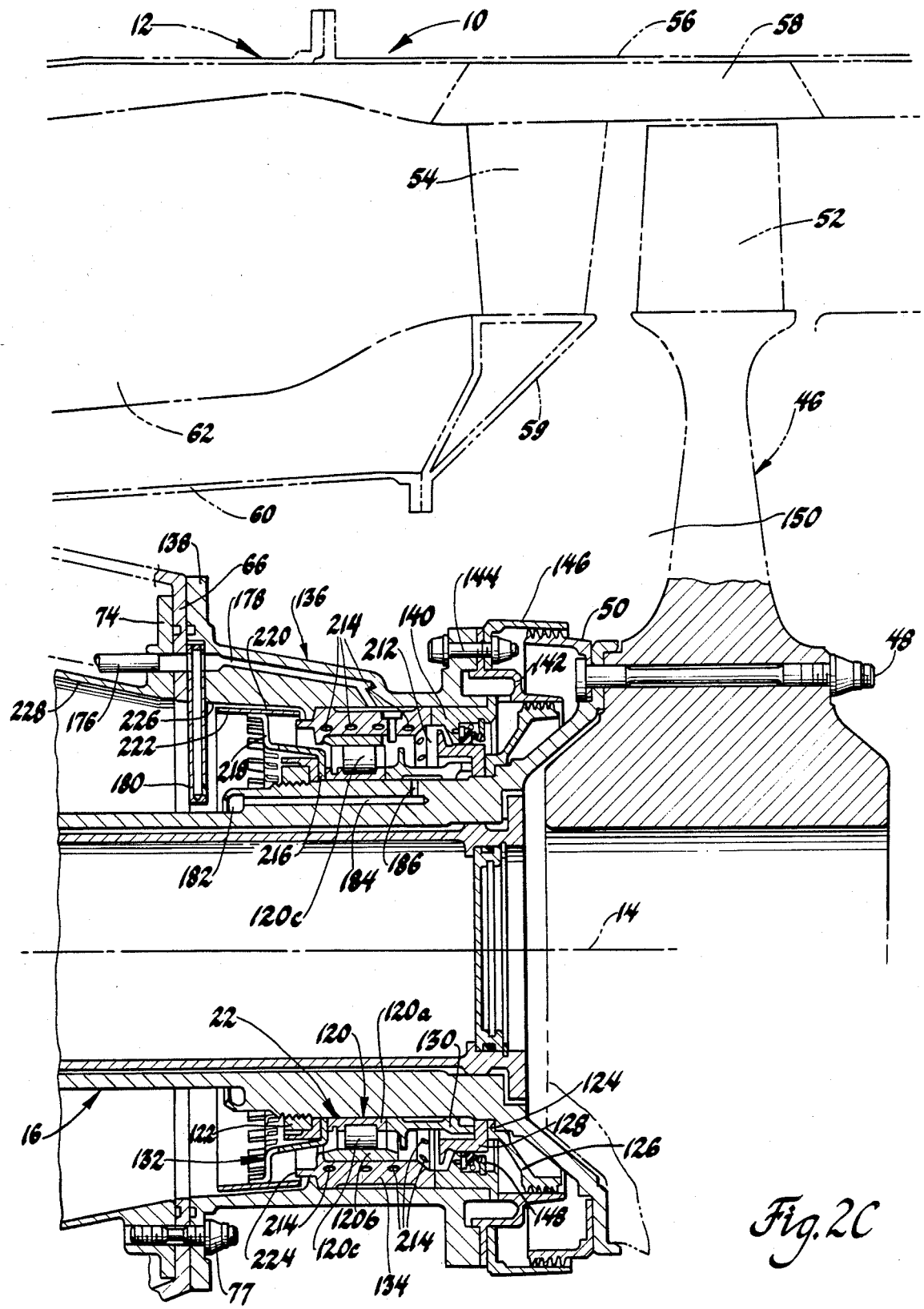

Referring to FIGS. 2b and 2c and describing oil scavenge from the second main bearing assembly 22, oil issuing from the radial orifices 186 to the right of the bearing 120 is thrown outward with high tangential velocity due to the high rotational speed of the slingers 130 and 128. This oil forms a pool in a trough 212 near the right end of the damping ring 134 as a result of centrifugal force. The entrances to a circumferential array of helical or spiral bores 214 through the damping ring 134 are located below the surface of the pool so that oil in the pool drains through the bores. While not illustrated, the damping ring 134 may be manufactured as a composite to facilitate formation of the helical bores 214. As described earlier with respect to oil traversing the bores 118 in damping ring 104, oil draining from trough 212 issues from the left side of the damping ring 134 with both tangential and axial motion components. The second pumping device 132 is like the first pumping device 102 and includes a hub section 216 whereat it is attached to the main shaft and a circumferential array of radially extending spokes 218. A flat impeller 220 having an inner surface 222 encircles the spokes 218 and is rigidly attached to each. The impeller 220 is disposed radially outboard of and overlaps a shelf 224 of the damping ring 134 onto which flows oil draining from trough 212 through bores 214. The oil spills off the end of the shelf 224 and migrates radially outward onto the inner surface 222 of the impeller 220. The impeller 220 imparts high rotational velocity to the oil on the surface 222 which centrifugally adheres to the surface while simultaneously migrating axially from the right end of the impeller, between the spokes 218, to the left end of the impeller due to the outward taper of the surface 222 axially toward the center of the sump. The oil on the surface 222, spinning at high rotational speed with the impeller 220, issues from the left end of the latter with high tangential velocity onto an inner surface 226 of the pedestal mount extension 136 which, in turn, is substantially a continuation of an inner surface 228 of the second wall 72. As seen best in FIGS. 2b and 2c, the inner surfaces 226 and 228 combine to define a conical internal surface around the right portion of the sump 85 having a small diameter end located adjacent the main bearing assembly 22 and a large diameter end spaced axially to the left of the small diameter end toward the center of the sump 85.

Referring to FIGS. 2a and 2b, the conical internal surface defined by inner surface 210 merges at its large diameter end with the left end of a constant diameter, internal cylindrical surface 230 on the second wall 72 around the sump 85. The diameter of the internal surface 230 is the same as the large diameter end of inner surface 210. Similarly, the conical internal surface defined by inner surfaces 226 and 228, at its left end, merges with the right end of internal cylindrical surface 230. The diameter of internal cylindrical surface 230 is the same as the large diameter end of inner surface 228.

The shield 168 through which the auxiliary pinion 160 extends intersects the sump 85 wholly within the confines of the constant diameter cylindrical surface 230 at an edge 232 which defines a drain entry in the cylindrical surface. A tapered baffle 234 is disposed within the shield 168 around the auxiliary pinion with an inner lip 236 attached to the pedestal mount at the edge 232 and an outer lip 238 aligned with an inner surface 240 of the shield 168. The inner surface 240 extends radially out beyond the gas flow path 34 to a relatively cool engine environment. A conventional scavenge pump, not shown, has its intake connected to the shield 168 in the relatively cool environment in such a way as to insure that any liquid adhering to and flowing along the surface 240 will be drawn into the scavenge pump.

The oil scavenge system according to this invention operates as follows. Oil issuing from both of the flat impellers 206 and 220 of the pumping devices 102 and 132, respectively, impinges on the inner surfaces 210 and 226 with high tangential velocity due to the high rotational speed of the flat impellers. The impinging oil centrifugally adheres to the inner surfaces and, because of their axial tapers, migrates axially from each of the bearing assemblies 20 and 22 toward the constant diameter inner surface 230. While the high tangential velocity imparted to the oil by the flat impellers 206 and 220 is the primary motivating force urging the oil toward the constant diameter inner surface 230, this migration is assisted by windage effects of the rotating main shaft 16, the sleeve 152, and the bevel gear 158.

When the migrating oil reaches the junctions between the inner surfaces 210 and 228 and the constant diameter inner surface 230, the tendency of the oil to migrate axially as it spins disappears. The oil does, however, continue to spin and therefore centrifugally adheres to the constant diameter inner surface 230. While the spin of the oil on the surface 230 does not cause the oil to flow axially, the continuous flow of oil along the inner surfaces 210 and 228 toward the inner surface 230 pushes the oil on the latter surface toward the center. In effect, then, the inner surface 230 has an annular trough of centrifugally adhered, spinning oil thereon even though the surface is stationary.

The drain entry defined by the edge 232 is at the bottom of the spinning trough of oil on the inner surface 230. When the spinning oil encounters the drain entry, the radial restraint otherwise provided by the inner surface 230 is removed so that centrifugal force expels the oil into the shield 168 and radially out along the baffle 234 and the inner surface 240 of the shield until collected at the scavenge pump intake, not shown. Because the oil is motivated into the shield 168 and toward the scavenge pump pick-up by centrifugal force rather than by gravity or pressure difference, the oil is scavenged regardless of the operating attitude or altitude of the engine. The direction at which the shield 168 leaves the sump is variable. Where the shield surrounds an element such as pinion 160, the shield is conveniently generally radially oriented. In other applications, the shield 168 could extend from the sump generally tangent to the constant diameter inner surface 230 to also take advantage of the tangential velocity of the oil thereon. While the scavenge system thus described does not rely on pressure difference nor gravity to motivate the oil, the drain entry defined by edge 232 is conveniently located at the lowermost point of the sump 85 in the attitude of the engine corresponding to the on-the-ground position of the aircraft. Thus, when the engine is shut down on the ground, residual oil drains by gravity into the shield 168 and to the scavenge pump intake.

It will be apparent that the oil scavenge system according to this invention can be incorporated in sumps having various wall configurations. For example, where there is sufficient space inboard of the gas flow path, the frustoconical inner surfaces of the walls defining the sump might be extended to meet at the center of the sump. In that case, the constant diameter surface is omitted and the drain entry is located at the juncture of the frustoconical surfaces where the spinning trough of oil is located. In another possible configuration, the frustoconical surfaces might be omitted. In that case, the oil with high tangential velocity issues directly onto the constant diameter surface and forms a spinning trough thereon. The drain entry is located in the constant diameter surface and the oil drains therefrom as described herein.

An additional advantage accruing through the use of the scavenge system according to this invention is that oil coking is avoided. That is, in the earlier scavenge systems employing multiple scavenge openings, residual oil tends to coke in those scavenge pump connections exposed to hot gas and through which oil is not flowing due to the attitude of the engine. In the scavenge system according to this invention, however, oil continuously flows through the shield 168 as it traverses the gas path 34 thereby continuously cooling the shield and avoiding the coking condition which exists when oil stops flowing in a high temperature area of the engine.

The embodiments of an invention in which an exclusive property or privilege is claimed are defined as follows:

1. In a gas turbine engine having
a case assembly defining a main axis of said engine,
a main shaft,
a bearing assembly between said case assembly and said main shaft supporting said main shaft on said case assembly for rotation about said main axis, and
oil supply means operative to direct a cooling and lubricating flow of oil to said bearing assembly,
an oil scavenge system comprising:
means on said case assembly defining a sump having one end exposed to said bearing assembly,
means on said sump defining an inner surface around said main axis adjacent said bearing assembly,
means on said bearing assembly operative to pump oil therefrom onto said inner surface with high tangential velocity so that said pumped oil centrifugally adheres to said inner surface and retains sufficient tangential velocity to form a centrifugally adhered annular pool of oil on said inner surface, means on said sump defining a drain entry in said inner surface at the bottom of said annular oil pool thereon so that said oil drains from said annular pool into said drain entry, and scavenge pump means on said engine connected directly to said drain entry and operative to exhaust from said sump all oil draining from said annular pool into said drain entry.

2. In a gas turbine engine having
a case assembly defining a main axis of said engine,
a main shaft,
a bearing assembly between said case assembly and said main shaft supporting said main shaft on said case assembly for rotation about said main axis, and
oil supply means operative to direct a cooling and lubricating flow of oil to said bearing assembly,
an oil scavenge system comprising:
means on said case assembly defining a sump having one end exposed to said bearing assembly,
means on said sump defining a frustoconical inner surface around said main axis having a small diameter end adjacent said bearing assembly and a large diameter end space axially along said main axis from said small diameter end,
means on said sump defining a constant diameter cylindrical inner surface around said main axis contiguous with said large diameter end of said frustoconical inner surface,
 the diameter of said cylindrical inner surface being equal to the diameter of said large diameter end of said frustoconical inner surface,
means on said bearing assembly operative to pump oil therefrom onto said frustoconical inner surface generally at said small diameter end with high tangential velocity so that said pumped oil centrifugally adheres to said frustoconical inner surface and migrates therealong axially toward said large diameter end and said constant diameter inner surface,
 said oil flowing from said frustoconical inner surface onto said constant diameter inner surface and retaining sufficient tangential velocity to centrifugally adhere to said constant diameter inner surface so that said oil forms an annular pool on said constant diameter inner surface,
means on said sump defining a drain entry in said constant diameter inner surface at the bottom of said annular oil pool thereon so that said oil drains from said annular pool into said drain entry, and
scavenge pump means on said engine connected directly to said drain entry and operative to exhaust from said sump all oil draining from said annular pool into said drain entry.

3. In a gas turbine engine having
a case assembly defining a main axis of said engine and an annular gas flow path around said main axis,
a main shaft,
means on said case assembly defining a pedestal mount around said main axis radially inboard of said gas flow path,
a pair of bearing assemblies between said main shaft and said pedestal mount rotatably supporting said main shaft on said pedestal mount at axially spaced locations along said main axis for rotation about said main axis, and
oil supply means operative to direct a cooling and lubricating flow of oil to each of said bearing assemblies,
an oil scavenge system comprising:
means on said pedestal mount defining a first frustoconical inner surface around said main axis having a small diameter end adjacent one of said bearing assemblies and a large diameter end space axially along said main axis from said small diameter end,
means on said pedestal mount defining a second frustoconical inner surface around said main axis having a small diameter end adjacent the other of said bearing assemblies and a large diameter end space axially along said main axis from said small diameter end,
means on said pedestal mount defining a constant diameter cylindrical inner surface around said main axis between said first and said second frustoconical inner surfaces and contiguous with said large diameter ends of each of said first and said second frustoconical inner surfaces,
 the diameter of said cylindrical inner surface being equal to the diameters of each of said large diameter ends of said first and said second frustoconical inner surfaces,
means on each of said one and said other bearing assemblies operative to pump oil therefrom onto the corresponding one of said first and said second frustoconical inner surfaces generally at said small diameter ends thereof with high tangential velocity so that said pumped oil centrifugally adheres to said first and said second frustoconical inner surfaces and migrates therealong axially toward said large diameter ends and said constant diameter inner surface,
 said oil flowing from said first and said second frustoconical inner surfaces onto said constant diameter inner surface and retaining sufficient tangential velocity to centrifugally adhere to said constant diameter inner surface so that said oil forms an annular pool on said constant diameter inner surface,
means defining a drain entry in said constant diameter inner surface at the bottom of said annular oil pool thereon so that said oil drains from said annular pool into said drain entry, and
scavenge pump means on said engine connected directly to said drain entry and operative to exhaust all oil draining from said annular pool into said drain entry.

4. The oil scavenge system recited in claim 3 wherein said means on each of said one and said other bearing assemblies operative to pump oil therefrom onto respective ones of said first and said second frustoconical inner surfaces includes
a flat impeller around said main axis having an inner surface radially inboard of and axially overlapping said small diameter end of the corresponding one of said first and said second frustoconical inner surfaces,
 said flat impeller inner surface tapering radially out in the axial direction proceeding from the corresponding end of said sump toward the center thereof,
a hub section attached to said main shaft for rotation as a unit therewith,
a circumferential array of radially extending spokes between said hub section and said flat impeller operative to connect said flat impeller to said hub section so that said flat impeller rotates at the speed of said main shaft, and means on said bearing assembly operative to channel said cooling and lubricating flow of oil after cooling and lubrication onto said impeller inner surface.

5. In a gas turbine engine having
a case assembly defining a main axis of said engine,
a main shaft,
a bearing assembly between said case assembly and said main shaft supporting said main shaft on said case assembly for rotation about said main axis, and
oil supply means operative to direct a cooling and lubricating flow of oil to said bearing assembly,
a method of scavenging oil from said bearing assembly comprising:
forming on said case assembly a sump having one end exposed to said bearing assembly,
forming on said sump an inner surface around said main axis adjacent said bearing assembly,
forming on said bearing assembly pumping means operative to pump oil therefrom onto said inner surface with high tangential velocity so that said pumped oil centrifugally adheres to said inner surface and retains sufficient tangential velocity to form a centrifugally adhered annular pool of oil on said inner surface,
forming on said sump inner surface a drain entry at the bottom of said annular oil pool thereon so that said oil drains from said annular pool into said drain entry, and
directly scavenging from said drain entry all oil draining from said annular pool into said drain entry.

6. In a gas turbine engine having
a case assembly defining a main axis of said engine,
a main shaft,
a bearing assembly between said case assembly and said main shaft supporting said main shaft on said case assembly for rotation about said main axis, and
oil supply means operative to direct a cooling and lubricating flow of oil to said bearing assembly,
a method of scavenging oil from said bearing assembly comprising:
forming on said case assembly a sump having one end exposed to said bearing assembly,
forming on said sump a frustoconical inner surface around said main axis having a small diameter end adjacent said bearing assembly and a large diameter end space axially along said main axis from said small diameter end,
forming on said sump a constant diameter cylindrical inner surface around said main axis contiguous with said large diameter end of said frustoconical inner surface having a diameter equal to the diameter of said large diameter end of said frustoconical inner surface,
forming on said bearing assembly pumping means operative to pump oil from said bearing assembly onto said frustoconical inner surface generally at said small diameter end with sufficient tangential velocity to centrifugally adhere said pumped oil to said frustoconical inner surface as it migrates therealong axially toward said large diameter end and to centrifugally adhere said pumped oil to said constant diameter inner surface so that said pumped oil forms an annular pool on said constant diameter inner surface,
forming a drain entry in said constant diameter inner surface of said sump at the bottom of said annular oil pool thereon so that said oil drains from said annular pool into said drain entry, and
directly scavenging said oil from said drain entry.

* * * * *